US009286292B2

(12) United States Patent
Dixit et al.

(10) Patent No.: US 9,286,292 B2
(45) Date of Patent: Mar. 15, 2016

(54) REAL-TIME JARGON TRANSLATION IN A COMMUNICATION SYSTEM

(71) Applicant: International Business Machines Corporation, Armonk, NY (US)

(72) Inventors: Priyansh Dixit, Bangalore (IN); Victor S. Moore, Gainesville, FL (US); David Nahamoo, Great Neck, NY (US); Dhandapani Shanmugam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 80 days.

(21) Appl. No.: 14/195,945

(22) Filed: Mar. 4, 2014

(65) Prior Publication Data

US 2015/0254234 A1    Sep. 10, 2015

(51) Int. Cl.
*G06F 17/28* (2006.01)
*G10L 15/26* (2006.01)

(52) U.S. Cl.
CPC ............... *G06F 17/289* (2013.01); *G10L 15/26* (2013.01)

(58) Field of Classification Search
CPC ... G06F 3/167; G06F 17/2785; G10L 15/183; G10L 15/22; G10L 2015/0631
USPC .............................................. 704/2, 8, 9, 235
See application file for complete search history.

(56) References Cited

U.S. PATENT DOCUMENTS

| 8,121,261 | B2 | 2/2012 | McQueen | |
|---|---|---|---|---|
| 8,326,596 | B2 | 12/2012 | Cohen | |
| 2008/0059152 | A1* | 3/2008 | Fridman et al. | 704/9 |
| 2010/0030551 | A1* | 2/2010 | Ark et al. | 704/8 |
| 2010/0324884 | A1 | 12/2010 | Jeffrey | |

* cited by examiner

*Primary Examiner* — Charlotte M Baker
(74) *Attorney, Agent, or Firm* — Isaac J. Gooshaw

(57) ABSTRACT

A computer retrieves profile information of a participant of a multi-party communication. The computer identifies an original jargon included in the multi-party communication based, at least in part, on the profile information. The computer generates a translated jargon by translating the original translated jargon, wherein the translated jargon can be understood by the participant of the multi-party communication. The computer sends the translated jargon to the participant of the multi-party communication.

20 Claims, 3 Drawing Sheets

REAL-TIME JARGON TRANSLATION IN A COMMUNICATION SYSTEM

BACKGROUND OF THE INVENTION

The present invention relates generally to the field of communication, and more particularly to the translation of jargon within a communication network.

Many organizations are increasingly participating in global communications which bring together many cultures, peoples and languages. Due to their diversity, effective communication between people from different backgrounds can be, and often is, complicated. Many locations, languages, and industries have their own slang, jargon, acronyms, and colloquialisms which are often not understood by others from different backgrounds. In many instances, the time required looking up the meaning of slang or jargon is often unavailable. This can lead to misunderstandings between the participants of a global communication.

SUMMARY

Embodiments of the present invention disclose a method, computer program product, and system for identifying and translating jargon during a multi-party communication. A computer retrieves profile information of a participant of a multi-party communication. The computer identifies an original jargon included in the multi-party communication based, at least in part, on the profile information. The computer generates a translated jargon by translating the original jargon, wherein the translated jargon can be understood by the participant of the multi-party communication. The computer sends the translated jargon to the participant of the multi-party communication.

DETAILED DESCRIPTION

Figure 1:
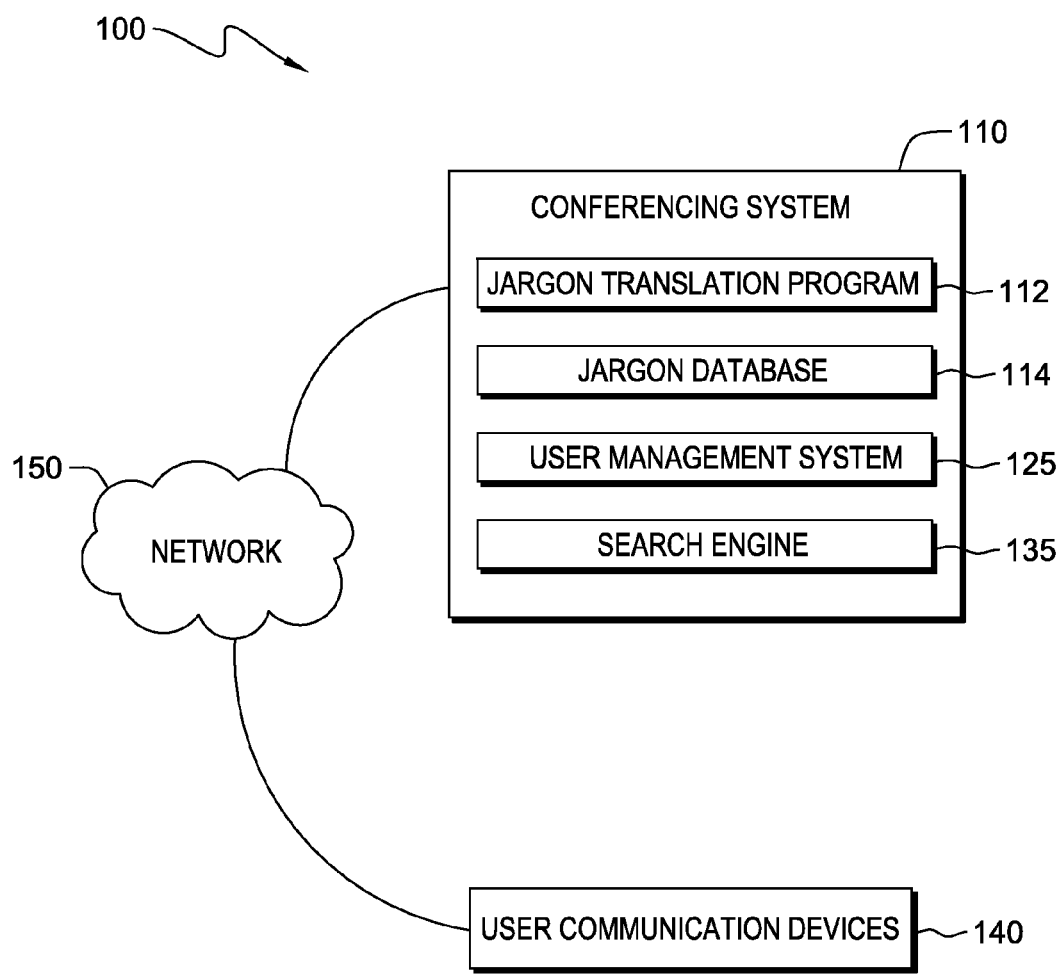
FIG. 1 is a functional block diagram illustrating a distributed communication environment, in accordance with an embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating a distributed communication environment, generally designated 100, in accordance with one embodiment of the present invention.

FIG. 1 is a block diagram illustrating distributed communication environment 100 in accordance with one embodiment of the present invention. Distributed communication environment 100 includes conferencing system 110 and user communication devices 140.

In this exemplary embodiment jargon translation program 112, jargon database 114, user management system 125, and search engine 135 are stored on conferencing system 110. However, in other embodiments, jargon translation program 112, jargon database 114, user management system 125, and search engine 135 may be stored externally and accessed through a communication network such as network 150. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between conferencing system 110 and user communication devices 140, and jargon translation program 112, jargon database 114, user management system 125, and search engine 135 in accordance with a desired embodiment of the present invention.

In various embodiments of the present invention, conferencing system 110 can be a server, a laptop computer, a tablet computer, a netbook computer, a personal computer (PC), or a desktop computer. User communication device 140 can be a digital phone (VOIP), a smart phone, a laptop computer, a tablet computer, a netbook computer, a personal computer (PC), or a desktop computer. In another embodiment, conferencing system 110 and user communication devices 140 represent computing systems utilizing clustered computers and components to act as a single pool of seamless resources. In general, conferencing system 110 and user communication devices 140 can be any computing device or a combination of devices with access to jargon database 114 and user management system 125 and is capable of running jargon translation program 112 and search engine 135. Conferencing system 110 and user communication devices 140 may include internal and external hardware components, as depicted and described in further detail with respect to FIG. 3.

Jargon translation program 112 identifies and translates jargon within a stream of communication data in real time, e.g., communication data of a multi-party communication session. Jargon translation program 112 identifies and translates jargon based, at least in part, on the location and linguistic details of each communication participant. In general, jargon translation program 112 receives a stream of communication data from each communication participant which can be one or more of (a) text data, (b) voice data, (c) or video data. Voice data and video data are transcribed into a stream of text data upon being received by jargon translation program 112. Once the stream of data is transcribed into text, jargon is identified and demographic information related to each communication participant is used to predict which pieces of jargon may not be understood by a communication participant.

In one embodiment of the present invention, jargon translation program 112 predicts whether or not a communication participant will understand a given piece of jargon based on information received from user management system 125. In some embodiments, if a communication participant is predicted by jargon translation program 112 to not be familiar with a present piece of jargon, then the piece of jargon along with its translation is sent to user communication device 140. If jargon translation program 112 predicts that a communication participant will be familiar with a piece of jargon, then the jargon is relayed to user communication device 140 without being translated, and jargon translation program 112 waits for a request for jargon translation before providing the translation to user communication device 140.

Jargon database 114 is a database used by jargon translation program 125 to identify jargon in a stream of communication data. Jargon database 114 can be a dictionary of common words in a given language or a combination of languages, a dictionary of jargon common in a language or a combination of languages, a dictionary of technical jargon for an industry or a combination of industries. In some embodiments of the present invention, each time that jargon translation program 112 identifies a piece of jargon, a record is created in jargon database 114 including the piece of jargon identified, a translation or synonym for the identified jargon, and the identity of the communication participants who used the piece of jargon.

User management system 125 is a database of profile and demographic information related to the participants of a communication. Profile and demographic information may include information such as a participant's location, identity, primary language, secondary languages, proficiency with secondary languages, technical background, occupation, and commonly used jargon. In general, user management system 125 contains profile information for the communication's participants that is used by jargon translation program 112 to translate original jargon, included in a communication, into a form that will be understood by the participants of that communication.

Search engine 135 is a search engine capable of receiving a search query and returning information related to the search query such as a definition, synonym, or translation of the search query. Search engine 135 interacts with jargon translation program 112 by providing definitions, synonyms, and translations for unknown pieces of jargon encountered by jargon translation program 125. In certain embodiments, search engine 135 is located externally from conferencing system 110 and is accessed, by jargon translation program 112, via network 150. In still other embodiments, search engine 135 is included as part of jargon translation program 112.

Figure 2:
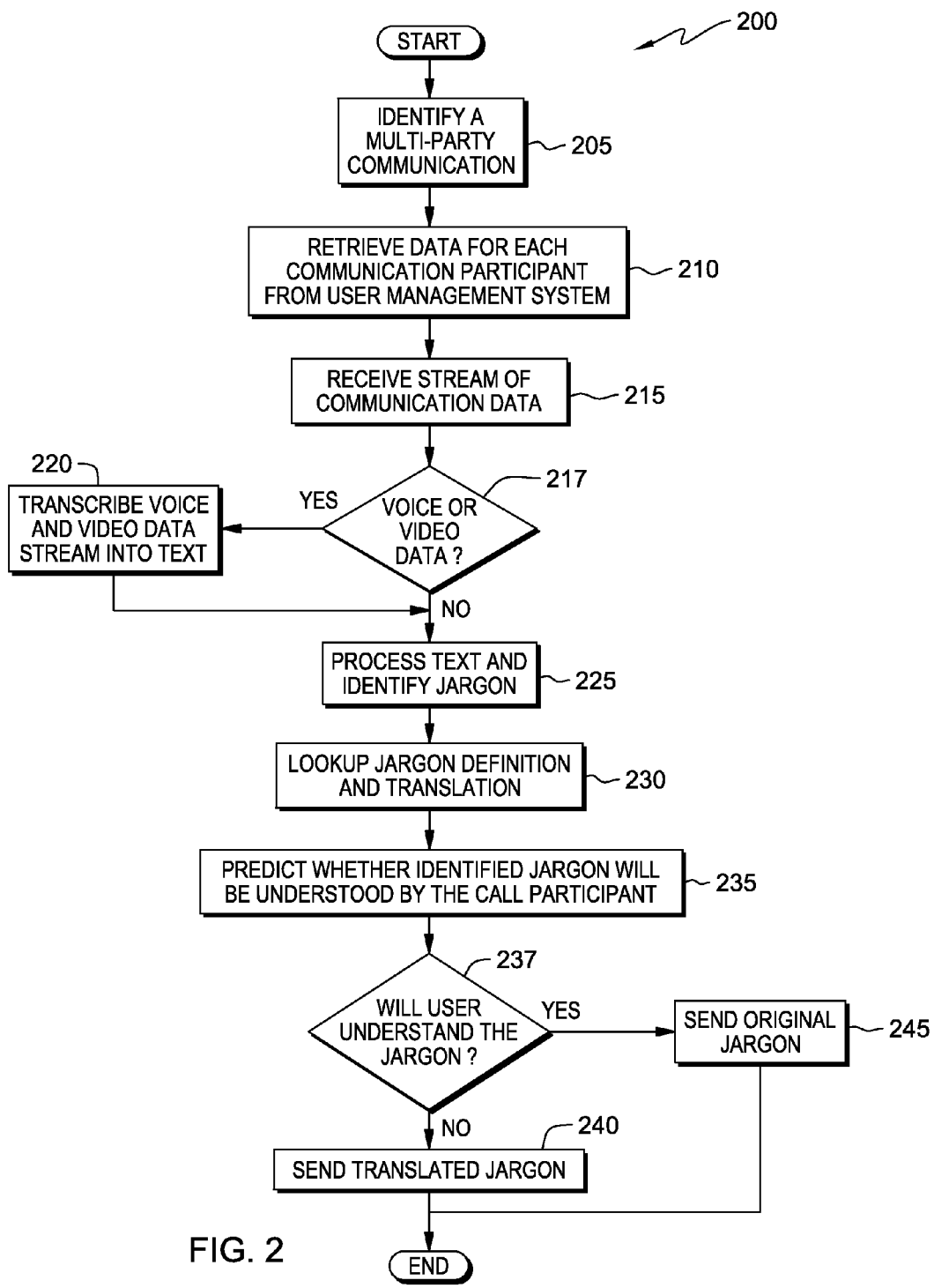
FIG. 2 is a flowchart depicting operational processes of a jargon translation program, executing on a conferencing system within the distributed communication environment of FIG. 1.

FIG. 2 is a flowchart, 200, depicting operational steps of jargon translation program 112 for identifying and translating jargon in accordance with one embodiment of the present invention.

In step 205, a multi-party communication is identified by jargon translation program 112. For example, a group of communication participants connect to conferencing system 110 using user communication devices 140 in an open chat session. User communication devices 140 may be mobile phones, smart phones, PDAs, tablet computers, laptop computers, or any other device or combination of devices capable of sending voice, video, or text data to conferencing system 110. In this exemplary embodiment, all communication participants are communicating with conferencing system 110 using smart phones however, in other embodiments different combinations of devices are possible.

Jargon translation program 112 retrieves a record for each identified communication participant from user management system 125, in step 210. A retrieved record includes information related to the identity, location, and native language of a communication participant, as well as any other languages that the communication participant is familiar with, including the extent of their proficiency in those languages. In some embodiments, once all communication participants are connected to conferencing system 110, each communication participant is identified and data for each communication participant is retrieved from user management system 125.

In some embodiments, communication participants are identified based on information used to connect to conferencing system 110 such as a phone number, email address, or system login credentials. In some situations a group of individuals may be using a single phone number. In such a situation the data retrieved from user management system 125 can reflect a group of individuals. For example, if a group of five people are sharing a single phone, which has a speaker function, for a meeting with another participant, then the data retrieved from user management system 125 would reflect all six participants of the conversation. In such a situation, the data for the individual participants may be stored in user management system 125 as a single entry that reflects all of the participants.

In this exemplary embodiment of the present invention, because all communication participants are connecting to conferencing system 110 through smart phones, they are identified, by jargon translation program 112, based on their respective phone numbers. If a communication participant does not have a corresponding record in user management system 125, then jargon translation program 112 uses any available information such as a phone number, name, and login credentials to predict the location and primary language of the communication participant. In other embodiments, a new communication participant may be prompted to answer questions related to their location and linguistic background.

Once all communication participants are connected onto the multi-party conference communication, a stream of communication data is received, by jargon translation program 112, from active communication participants, in step 215. This is typically voice data, video data and text data. In other embodiments other forms of communication data are received; often depending on the devices which each of the communication participants are using to communicate with conferencing system 110 and the type of communication being hosted by conferencing system 110. In such embodiments, jargon translation program 112 includes modifications to process those types of communication into a text format. In other embodiments, jargon translation program 112 can identify non-word symbols, e.g., emoticons and shapes, which can then be filtered out or added in a word format, e.g., "smile face" or "circle", to a text form of the communication data.

In decision step 217, jargon translation program 112 determines whether voice or video data has been received. If voice or video data has not been received by conferencing system 110 (decision step 217, no branch), e.g. the communication includes text only, then jargon translation program 112 proceeds to step 225. If voice or video data has been received by conferencing system 110 (decision step 217, yes branch), then jargon translation program 112 proceeds to step 220.

In step 220, voice or video data received by conferencing system 110 is transcribed, by jargon translation program 112, into a stream of text. Various embodiments of jargon translation program 112 can utilize a number of voice recognition approaches to transcribe non-text communication data. In some embodiments, the communication data is transcribed into the most common language spoken by the majority of communication participants. In certain situations, the communication data is transcribed into a language included as part jargon database 114.

In step 225, jargon translation program 112 identifies jargon that is included in text included in the communication data, which includes any text that was generated in step 220. In some embodiments, jargon translation program 112 identifies jargon based on an entry in an existing jargon included as part of jargon database 114, which includes a definition or translation for that jargon. In other embodiments, jargon translation program 112 identifies jargon that has not been encountered previously, i.e., does not have an existing entry in jargon database 114, and performs a search for that jargon using search engine 135. Jargon that is found in the search results is added to jargon database 114. In some embodiments, jargon may be identified based on a pre-existing database of linguistic or technical jargon such as jargon database 114. In other embodiments, jargon is identified based on words which cannot be found in a common dictionary. In most embodiments, jargon translation program 112 applies a variety of text analytics to identify jargon included in the stream of conversation data, which may have been transcribed.

In step 230, the identified jargon is translated and defined by jargon translation program 112. In this embodiment, jargon translation program 112 attempts to retrieve a translation and definition for the identified jargon from jargon database 114. A translation for jargon can include, for example i) identifying a definition of the original jargon, ii) identifying a synonym of the original jargon, iii) identifying an equivalent of the original jargon in another language, or iv) identifying the original jargon itself in another language. In general, identifying an equivalent of the original jargon in another language often involves a conversion of the jargon into an equivalent version that exists in the participant's native language. If there is no existing translation or definition available, i.e., there is no existing entry for that jargon or there is missing information for that jargon, then jargon translation program 112 uses search engine 135 to provide a most probable translation or definition for the jargon based on text analytics. For example, based on sentence structure, jargon translation program 112 can determine that a given jargon is most likely a verb or a noun. Jargon translation program 112 then searches for the most likely translation and definition for that jargon based on the context and content of the words and phrases that surround that jargon.

In some embodiments, jargon may be translated according to another policy such as automatically translating any non-standard information encountered within the conversation or only translating jargon upon receiving a request from a communication participant to do so.

In this exemplary embodiment of the present invention, jargon translation program 112 predicts, for each respective communication participant, whether the identified jargon will be understood by that communication participant, in step 235. Prediction of whether or not a given communication participant will understand a jargon is based on a statistical analysis of the demographic information received for each participant as well as the translation, definition, results of the text analysis and any search results for that jargon. Some factors, such as a native language, may be counted more heavily, i.e., weighted, in the analysis than other factors, such as current place of residence.

In decision step 237, jargon translation program 112 determines whether the communication participant is expected to understand the jargon based on the prediction. If jargon translation program 112 determines that a communication participant is expected to understand the jargon (decision step 237, yes branch), then jargon translation program 112 sends the original jargon to that communication participant, in step 245. If jargon translation program 112 determines that the communication participant is not expected to understand the jargon (decision step 237, no branch), then jargon translation program 112 sends the translation of that jargon to that communication participant, in step 240. In one exemplary embodiment, translated jargon is sent to user communication device 140 on a data channel separate from the one used to transmit the communication data. In other embodiments, translated jargon may be sent to user communication device 140 on the same data channel as the communication data.

In some embodiments, if a participant in the communication receives an un-translated piece of jargon which they are not familiar with, then that communication participant can send a request for jargon translation, via user communication device 140, to jargon translation program 112. A communication participant may initiate a request for jargon translation using a button, a voice command, a gesture, or any interaction with user communication device 140. In response to such a request, jargon translation program 112 provides a translation or definition for that jargon to the requesting communication participant.

Figure 3:
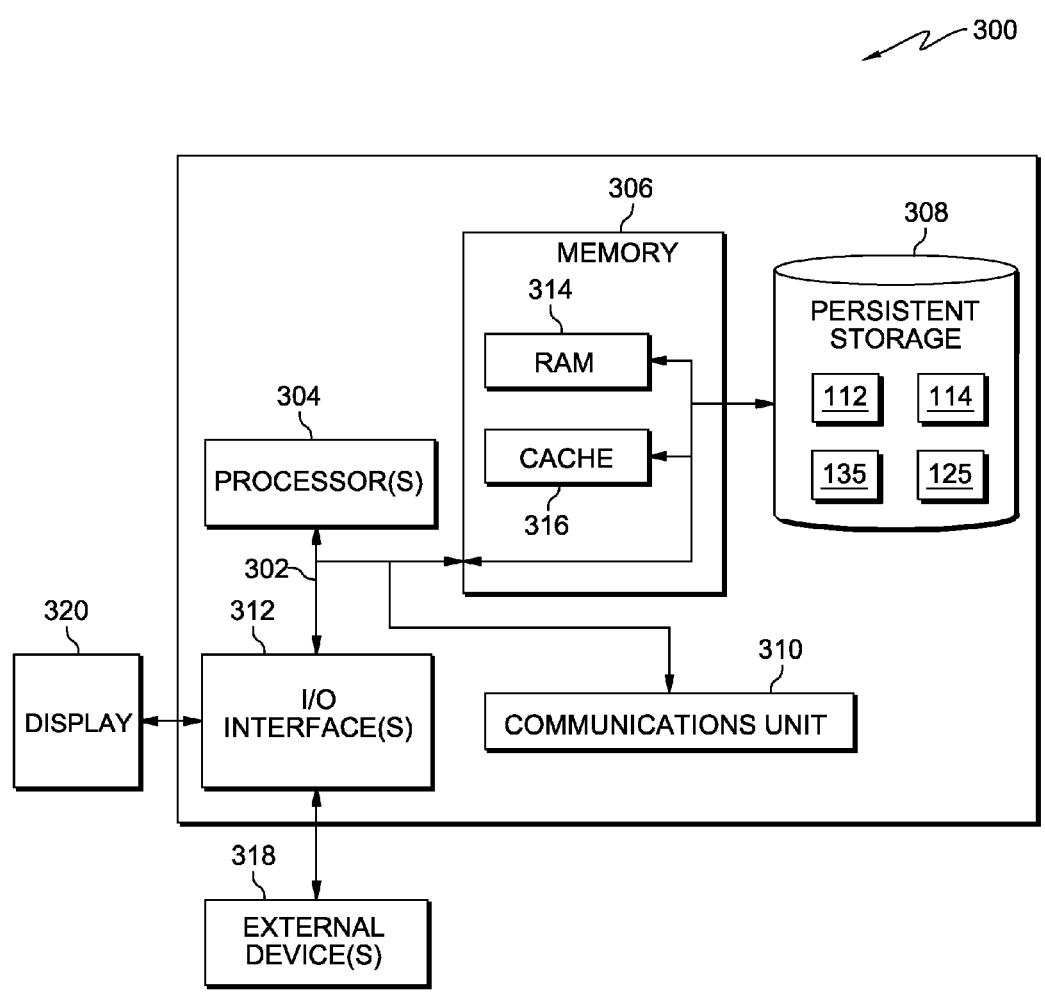
FIG. 3 depicts a block diagram of components of the conferencing system executing the jargon translation program, in accordance with an embodiment of the present invention.

FIG. 3 depicts a block diagram, 300, of respective components of conferencing system 110 and user communication devices 140 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Conferencing system 110 and user communication devices 140 respectively include communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Jargon translation program 112, jargon database 114, user management system 125, and search engine 135 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Jargon translation program 112, jargon database 114, user management system 125, and search engine 135 may be downloaded to persistent storage 308 through communications unit 310.

I/O interface(s) 312 allows for input and output of data with other devices that may be connected to conferencing system 110 and user communication devices 140. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., jargon translation program 112, jargon database 114, user management system 125, and search engine 135 can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus, the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method for identifying and translating jargon, the method comprising:
    retrieving, by a computer, a profile information of a first participant of a multi-party communication, wherein the profile information of the first participant i) includes demographic information related to the first participant, and ii) indicates a location of the first participant;
    identifying, by the computer, an original jargon submitted by a second participant included in the multi-party communication based, at least in part, on the profile information of the first participant;
    predicting, by the computer, whether the first participant will understand the original jargon based, at least in part, on the demographic information related to the first participant and the location of the first participant;
    responsive to a prediction that the first participant will not understand the original jargon, generating, by the computer, a translated jargon by translating the original jargon based, at least in part, on the profile information of the first participant, wherein the translated jargon can be understood by the first participant of the multi-party communication; and
    sending, by the computer, the translated jargon to the first participant of the multi-party communication.

2. The method of claim 1, the method further comprising:
    predicting, by the computer, whether the participant of the multi-party communication will understand the original jargon based, at least in part, on i) the profile information of the first participant and a profile information of a second participant of the multi-party communication, wherein the profile information of the second participant includes a location of the second participant and a primary language used for communication by the second participant, and ii) at least one of: a translation of the original jargon, a definition of the original jargon, a result of a text analysis including the original jargon, and a search result for original jargon.

3. The method of claim 1, the method further comprising:
    receiving, by the computer, a request for translation of the original jargon from a third participant included in the multi-party communication;
    translating, by the computer, the original jargon for which translation was requested based at least in part on a profile information of the third participant, wherein the profile information of the third participant includes a location of the third participant and a primary language used for communication by the third participant; and
    sending, by the computer, the original jargon and the translated jargon to the third participant of the multi-party communication that submitted the request for jargon translation.

4. The method of claim 1, wherein the multi-party communication includes at least one of (a) text data, (b) voice data, (c) or video data.

5. The method of claim 1, wherein profile information of the first participant includes at least one of: information related to the location of the first participant, an identity of the first participant, one or more secondary languages used for communication by the first participant, a technical background of the first participant, and an occupation of the first participant.

6. The method of claim 1, wherein translating the original jargon includes at least one of: i) identifying a definition of the original jargon, ii) identifying a synonym of the original jargon, iii) identifying an equivalent of the original jargon in another language, or iv) identifying the original jargon itself in another language.

7. The method of claim 1, the method further comprising:
    transcribing, by the computer, data included in the multi-party communication into text.

8. A computer program product for identifying and translating jargon, the computer program product comprising a computer readable storage medium having program instructions embodied therewith, the program instructions executable by a computer, the program instructions comprising:
    program instructions to retrieve a profile information of a first participant of a multi-party communication, wherein the profile information of the first participant i) includes demographic information related to the first participant, and ii) indicates a location of the first participant;
    program instructions to identify an original jargon submitted by a second participant included in the multi-party communication based, at least in part, on the profile information of the first participant;
    program instructions to predict whether the first participant will understand the original jargon based, at least in part, on the demographic information related to the first participant and the location of the first participant;
    program instructions to respond to a prediction that the first participant will not understand the original jargon by generating a translated jargon by translating the original jargon based, at least in part, on the profile information of the first participant, wherein the translated jargon can be understood by the first participant of the multi-party communication; and
    program instructions to send the translated jargon to the first participant of the multi-party communication.

9. The computer program product of claim 8, the program instructions further comprising:
    program instructions to predict whether the participant of the multi-party communication will understand the original jargon based, at least in part, on i) the profile information of the first participant and a profile information of a second participant of the multi-party communication, wherein the profile information of the second participant includes a location of the second participant and a primary language used for communication by the second participant, and ii) at least one of: a translation of the original jargon, a definition of the original jargon, a result of a text analysis including the original jargon, and a search result for original jargon.

10. The computer program product of claim 8, the program instructions further comprising:
    program instructions to receive a request for translation of the original jargon from a third participant included in the multi-party communication;
    program instructions to translate the original jargon for which translation was requested based at least in part on a profile information of the third participant, wherein the profile information of the third participant includes a location of the third participant and a primary language used for communication by the third participant; and program instructions to send the original jargon and the translated jargon to the third participant of the multi-party communication that submitted the request for jargon translation.

11. The computer program product of claim 8, wherein the multi-party communication includes at least one of (a) text data, (b) voice data, (c) or video data.

12. The computer program product of claim 8, wherein profile information of the first participant includes at least one of: information related to the location of the first participant, an identity of the first participant, one or more secondary languages used for communication by the first participant, a technical background of the first participant, and an occupation of the first participant.

13. The computer program product of claim 8, wherein translating the original jargon includes at least one of: i) identifying a definition of the original jargon, ii) identifying a synonym of the original jargon, iii) identifying an equivalent of the original jargon in another language, or iv) identifying the original jargon itself in another language.

14. The computer program product of claim 8, the computer program product further comprising:

program instructions to transcribe data included in the multi-party communication into text.

15. A computer system for identifying and translating jargon, the computer system comprising:

one or more computer processors;

one or more computer-readable storage medium;

program instructions stored on the computer-readable storage medium for execution by at least one of the one or more processors, the program instructions comprising:

program instructions to retrieve a profile information of a first participant of a multi-party communication, wherein the profile information of the first participant i) includes demographic information related to the first participant, and ii) indicates a location of the first participant;

program instructions to identify an original jargon submitted by a second participant included in the multi-party communication based, at least in part, on the profile information of the first participant;

program instructions to predict whether the first participant will understand the original jargon based, at least in part, on the demographic information related to the first participant and the location of the first participant;

program instructions to respond to a prediction that the first participant will not understand the original jargon by generating a translated jargon by translating the original jargon based, at least in part, on the profile information of the first participant, wherein the translated jargon can be understood by the first participant of the multi-party communication; and program instructions to send the translated jargon to the first participant of the multi-party communication.

16. The computer system of claim 15, the program instructions further comprising:

program instructions to predict whether the participant of the multi-party communication will understand the original jargon based, at least in part, on i) the profile information of the first participant and a profile information of a second participant of the multi-party communication, wherein the profile information of the second participant includes a location of the second participant and a primary language used for communication by the second participant, and ii) at least one of: a translation of the original jargon, a definition of the original jargon, a result of a text analysis including the original jargon, and a search result for original jargon.

17. The computer system of claim 15, the program instructions further comprising:

program instructions to receive a request for translation of the original jargon from a third participant included in the multi-party communication;

program instructions to translate the original jargon for which translation was requested based at least in part on a profile information of the third participant, wherein the profile information of the third participant includes a location of the third participant and a primary language used for communication by the third participant; and program instructions to send the original jargon and the translated jargon to the third participant of the multi-party communication that submitted the request for jargon translation.

18. The computer system of claim 15, wherein profile information of the first participant includes at least one of: information related to the location of the first participant, an identity of the first participant, one or more secondary languages used for communication by the first participant, a technical background of the first participant, and an occupation of the first participant.

19. The computer system of claim 15, wherein translating the original jargon includes at least one of: i) identifying a definition of the original jargon, ii) identifying a synonym of the original jargon, iii) identifying an equivalent of the original jargon in another language, or iv) identifying the original jargon itself in another language.

20. The computer system of claim 15, the program instructions further comprising:

program instructions to transcribe data included in the multi-party communication into text.

* * * * *